May 25, 1965  J. MAURICE  3,185,274
CLUTCH DEVICE WITH MULTIPLE OUTPUTS
Filed June 15, 1962  4 Sheets-Sheet 1
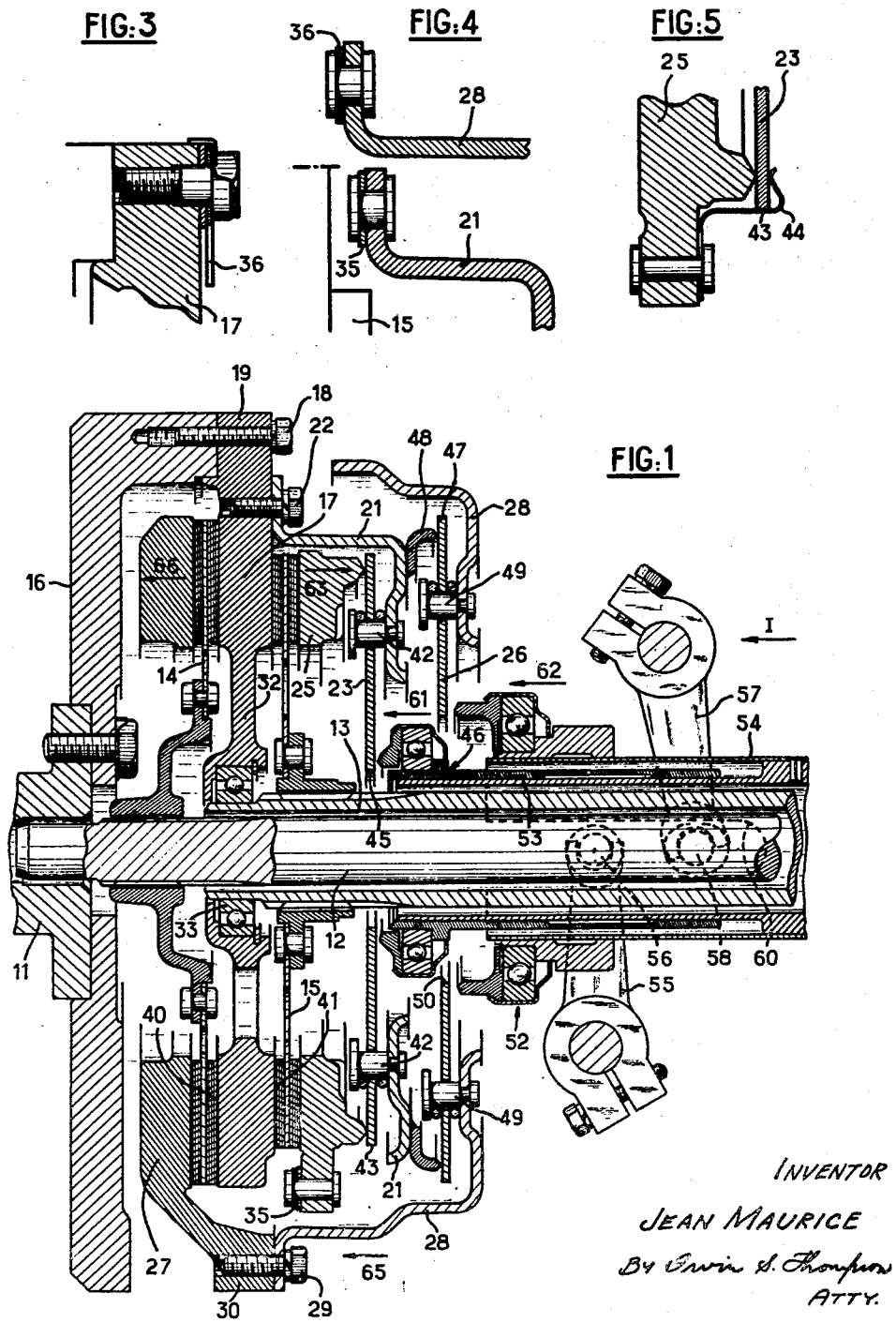

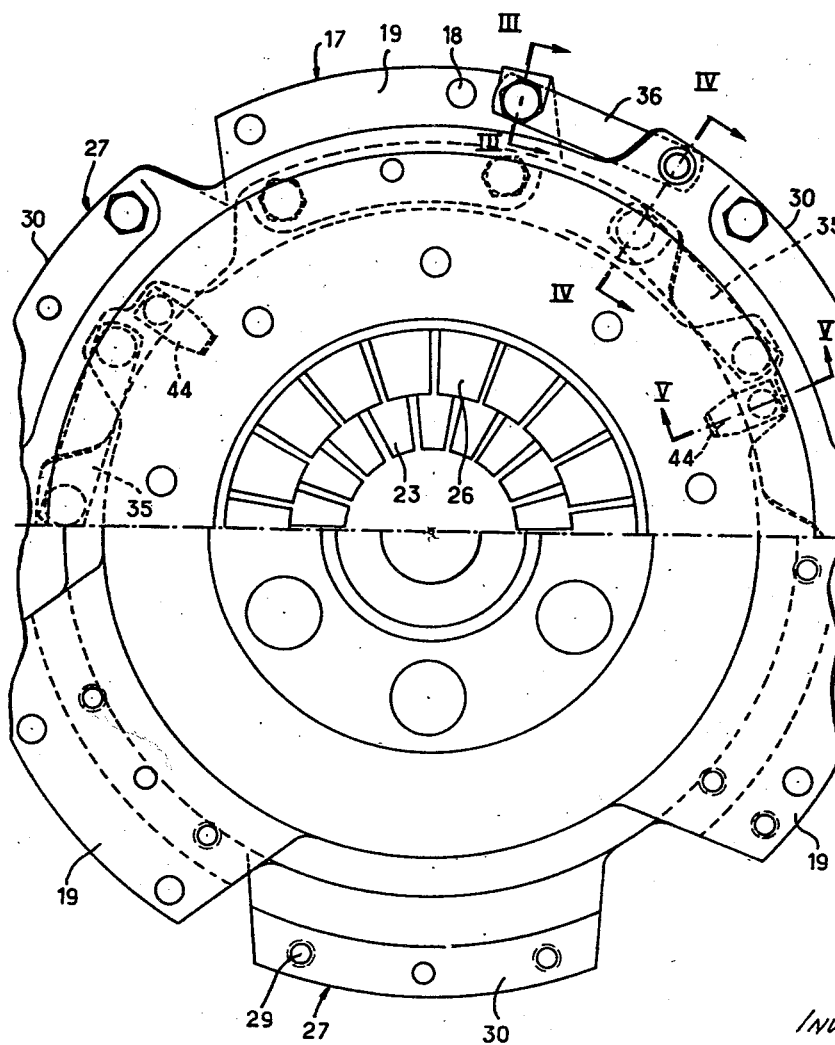

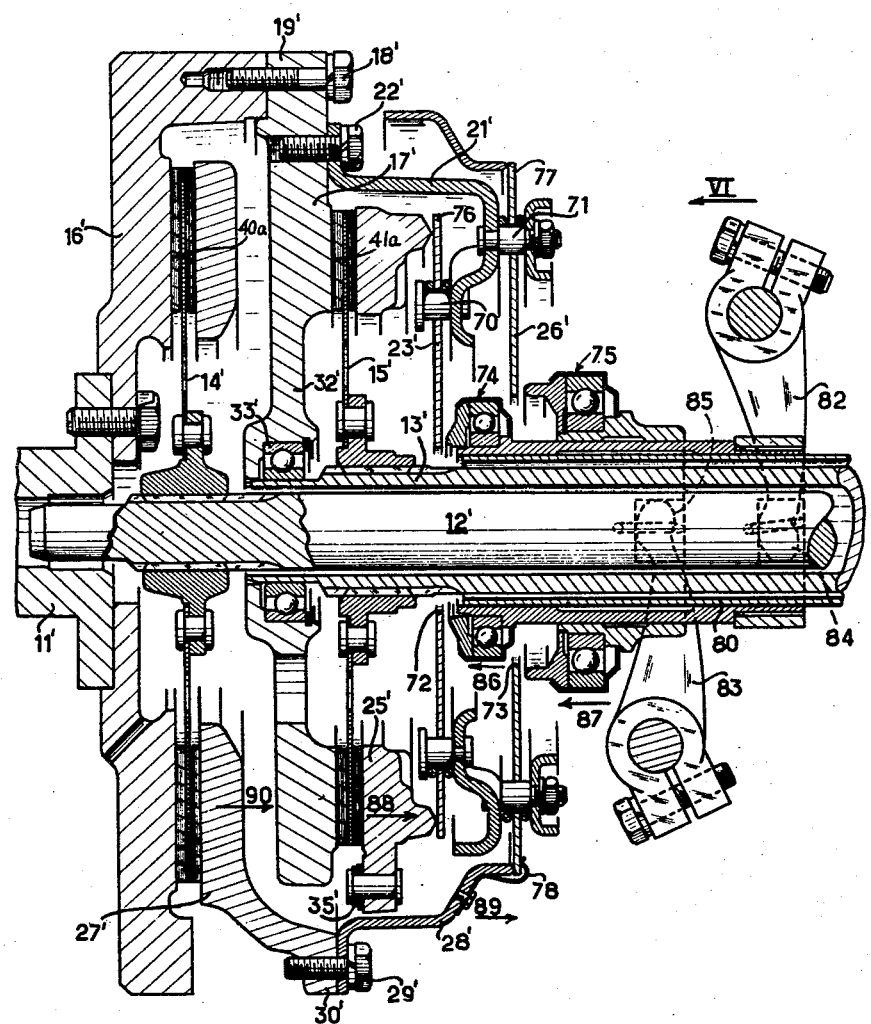

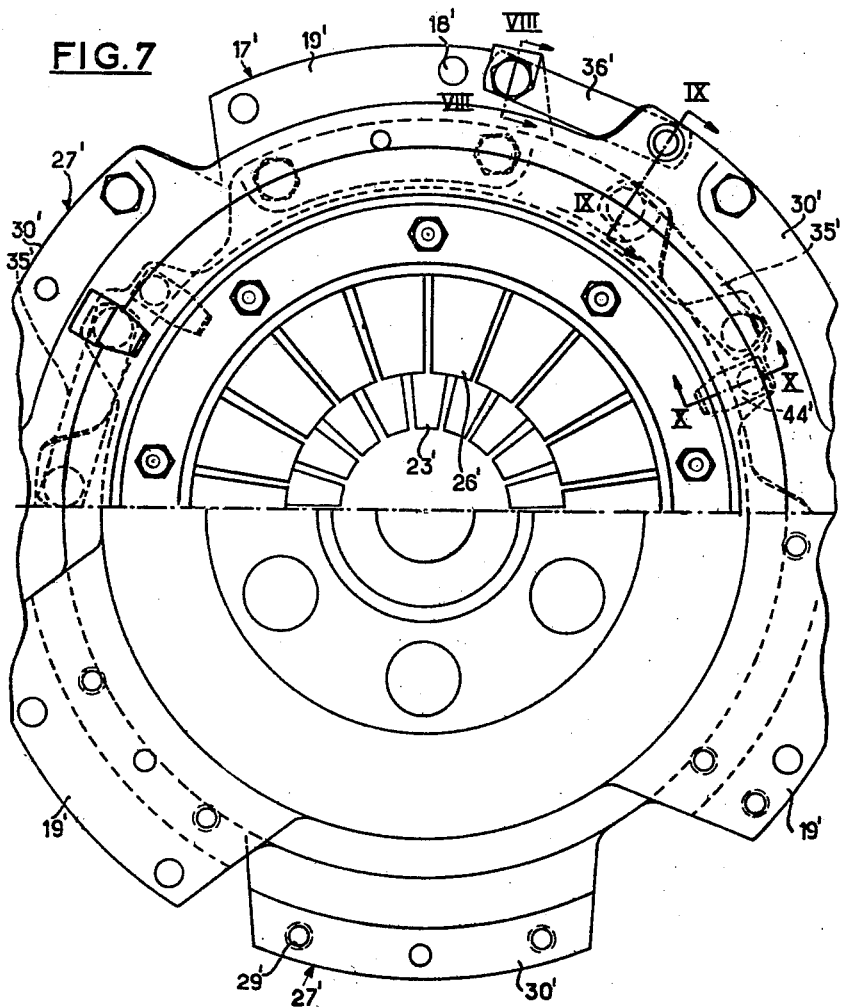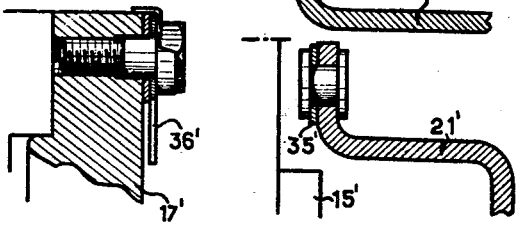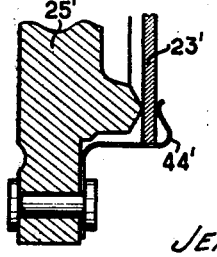

United States Patent Office 3,185,274
Patented May 25, 1965

3,185,274
CLUTCH DEVICE WITH MULTIPLE OUTPUTS
Jean Maurice, Paris, France, assignor to Societe Anonyme Francaise du Ferodo, Paris, France, a corporation of France
Filed June 15, 1962, Ser. No. 202,873
Claims priority, application France, July 1, 1961, 866,719
8 Claims. (Cl. 192—48)

The present invention relates to clutches, and more particularly to clutches having two outputs, that is to say, ensuring the coupling between a driving shaft and two coaxial driven shafts known as the inner shaft and the outer shaft.

The invention has especially for its object to construct a clutch of this kind with two outputs which permits either of the two driven shafts to be driven independently and which has a particularly compact shape which ensures an excellent behaviour of the elastic members and which at the same time is economical to construct. According to the invention, the two driven shafts each being provided with a friction disc, the friction disc of the inner shaft is disposed between the usual fly-wheel fixed to the driving shaft and a reaction plate, known as the auxiliary plate, fixed at its periphery to the said fly-wheel by spaced apart feet, while the friction disc of the outer shaft is mounted between the said auxiliary plate and a rigid annular cover fixed at its outer periphery to the said auxiliary plate and on each side of which are supported two elastic annular diaphragms, the first of which is arranged inside the cover and controls a first pressure-plate associated with the friction disc of the outer shaft, while the second, external to the cover, controls a second pressure-plate associated with the friction disc of the inner shaft, the coupling between this second pressure-plate and the second diaphragm being ensured by a casing external to the cover, known as a transfer casing, rigidly coupled to the second pressure-plate by feet arranged in the spaces formed between the fixing feet of the auxiliary plate.

A clutch of this kind with two outputs has a remarkably small overall axial size, by reason especially of the utilization of elastic diaphragms which, as is well known, replace at the same time the clutch springs and de-clutching levers of the usual type. This clutch with two outputs is in a way constituted by two separate clutches arranged one inside the other, the clutch associated with the outer shaft being practically enclosed by the clutch associated with the inner shaft, except as regards the lugs for fixing the auxiliary plate to the fly-wheel, which pass through the outer assembly formed by the transfer casing and the second pressure plate.

It will be appreciated that the elastic members of the clutch are therefore either distant from the parts brought up to high temperature in course of operation, or in contact with such parts solely by linear bearing surfaces which only permit small exchanges of heat. Thus, although the circulation of air in the axial direction is hindered by the elastic diaphragms, no excessive rise in temperature takes place which is liable to interfere with the good performance of the said diaphragms.

In order to ensure the relative centering of the driven shafts and of the whole of the clutch, the invention provides, for this special type of clutch, an extension of the internal portion of the auxiliary plate up to the vicinity of the outer shaft, and to arrange a ball-bearing between this shaft and the said internal portion of the auxiliary plate. It will be noted that this arrangement, which has a tendency to limit the air circulation in the axial direction, can however be adopted without disadvantage because, as has already been stated above, the elastic members are protected from excessive increases in temperature.

The first pressure plate is advantageously coupled to the cover by tangential tongues which are preferably located in the vicinity of the plane of the friction disc carried by the outer shaft. In a similar way, the assembly formed by the second pressure-plate and the transfer casing on which this plate is fixed may be coupled by tangential tongues to the assembly formed by the fly-wheel, the auxiliary plate and the cover, and preferably to the auxiliary plate itself.

There may be provided in advance two separate series of fixing points of the tangential tongues coupling the first pressure-plate, together with the tangential coupling tongues of the second pressure-plate so as to permit the clutch to be adapted to both possible directions of rotation without any special machining being necessary so as to pass from one direction to the other.

In accordance with one form of construction which is particularly compact, in which the two friction discs are respectively applied against the two opposite faces of the auxiliary plate, during de-clutching, the two pressure-plates carry out movements in opposite directions, the first control diaphragm then being supported against the cover in the usual manner, that is to say at points located on a circumference intermediate between its outer edge coupled to the first pressure-plate and its inner edge subjected to the action of a first de-clutching stop, while the second diaphragm is supported on the cover at points adjacent to its outer edge, this second diaphragm being then coupled to the transfer casing at points located on a circumference intermediate between its outer edge and its inner edge, which is subjected to the action of a second de-clutching stop.

The first diaphragm is thus equivalent to a series of levers of the first kind, that is to say in which the "point of support" is located between the "power" and the "resistance." The second diaphragm is equivalent to a series of levers of the second kind, that is to say in which the resistance is located between the point of support and the power.

According to a second form of embodiment in which the friction disc of the outer shaft is applied against the auxiliary plate whereas the friction disc of the inner shaft is applied against the fly-wheel coupled to the driving shaft, during de-clutching the two pressure-plates carry out movements in the same direction, the two diaphragms being then supported on the cover at points located on a circumference intermediate between their inner edge and their outer edge, the inner edges of these diaphragms being respectively subjected to the action of a first and a second de-clutching stop, while their outer edges are respectively coupled to the first pressure-plate and to the transfer casing. The two diaphragms are then both equivalent to a series of levers of the first kind.

The particular features and advantages of the invention will be further brought out from the description which follows below, given by way of example, reference being made to the accompanying drawings, in which:

FIG. 1 is an axial section of a first form of embodiment of the invention;

FIG. 2 is, with respect to one half, a view in the direction of the arrow I of FIG. 1, and in respect of the other half, a similar view assuming all the parts external to the auxiliary plate to have been removed;

FIG. 3 is a partial section of the auxiliary plate taken along the line III—III of FIG. 2, to a larger scale;

FIG. 4 is a partial section of the cover and the casing taken along the line IV—IV of FIG. 2, to a larger scale;

FIG. 5 is a partial section of the first pressure-plate, taken along the line V—V of FIG. 2, to a larger scale;

FIG. 6 is an axial section of a second form of embodiment of the invention;

FIG. 7 is, as to one half, a view following the arrow VI of FIG. 6 and as to the other half, a similar view assuming that all the external parts of the auxiliary plate have been removed;

FIG. 8 is a partial section of the auxiliary plate taken along the line VIII—VIII of FIG. 7, to a larger scale;

FIG. 9 is a partial section of the cover and the casing taken along the line IX—IX of FIG. 7, to a larger scale;

FIG. 10 is a partial section of the first pressure-plate taken along the line X—X of FIG. 7, to a larger scale.

The two clutches shown are both intended to ensure the coupling between a driving shaft 11 and two independent coaxial driven shafts, namely an inner shaft 12 and an outer shaft 13.

The two driven shafts 12 and 13 each carry a friction disc referenced respectively by 14 and 15. The friction disc 14 of the inner shaft 12 is arranged between the usual fly-wheel 16 fixed to the driving shaft 11, and a reaction plate 17, known as an auxiliary plate, fixed at 18 to the fly-wheel 16 by three spaced lugs 19 on this plate.

The friction disc 15 of the outer shaft 13 is arranged between the auxiliary plate 17 and a rigid annular cover 21, fixed at 22 to the auxiliary plate 17. On each side of the cover 21 are supported two elastic annular diaphragms, the first of which 23 is arranged inside the cover 21 and controls a first pressure-plate 25 associated with the friction disc 15 of the outer shaft 13; the second diaphragm 26 is outside the cover 21 and controls a second pressure-plate 27 associated with the friction disc 14 of the inner shaft 12. The coupling between this second pressure-plate 27 and the second diaphragm 26 is effected by a casing 28 external to the cover 21, and known as a transfer casing, rigidly coupled at 29 to the second pressure-plate 27 by lugs 30 formed on this latter and arranged in the spaces between the fixing lugs 19 of the auxiliary plate 17.

It will be noted that the transfer casing 28, which has practically the form of a body of revolution, can be produced by stamping and is then suitably notched so as to form fixing lugs for the tangential tongues 36.

With a view to ensuring the relative centering of the driven shafts 12 and 13 and of the whole of the clutch, the inner portion 32 of the auxiliary plate 17 is extended towards the centre up to the vicinity of the outer shaft 13, and a ball-bearing 33 is arranged between this shaft and the said inner portion of the plate 17.

The first pressure-plate 25 is coupled to the cover 21 by three tangential tongues 35 (FIGS. 2, 4, 35' in FIGS. 7 and 9) located in the vicinity of the plane of the face of the plate 25 which co-operates frictionally with the disc 15 mounted on the outer shaft.

In a similar way, the assembly formed by the second pressure-plate 27 and the casing 28 rigidly fixed to this plate is coupled by three tangential tongues 36 to the auxiliary plate 17 (FIGS. 2, 3, 17' in FIGS. 7 and 8).

According to the first form of embodiment shown in FIGS. 1 to 5, in which the two friction discs 14 and 15 are respectively applied against the two opposite faces 40 and 41 of the auxiliary plate 17, the two pressure-plates 25 and 27 carry out movements in opposite directions during de-clutching.

The first control diaphragm 23 is then supported on the cover 21 in the usual manner, that is to say by tenons 42 located on a circumference intermediate between its outer edge 43, connected by clips 44 (FIG. 5) to the first pressure-plate 25, and its inner edge 45 subjected to the action of a first de-clutching stop 46. The second diaphragm 26 is supported in the vicinity of its outer edge 47 on a collar 48 carried by the cover 21. This diaphragm 26 is connected to the transfer casing 28 by tenons 49 located on a circumference intermediate between its outer edge 47 and its inner edge 50, which is subjected to the action of a second de-clutching stop 52.

The de-clutching stops 46 and 52 slide respectively on two coaxial sleeves 53 and 54, arranged round the outer shaft 13 and made fast to the fixed casing of the clutch.

The stop 52 which slides on the sleeve 54 is actuated by an oscillating fork 55, the arms of which are respectively in engagement with two lateral studs 56 carried by the said stop 52. The stop 46 which slides on the inner sleeve 53 is operated by an oscillating fork 57, the arms of which are respectively engaged with two lateral studs 58, which are fixed to the stop 46 and which each pass through the outer sleeve 54 by an elongated opening 60 formed in this sleeve.

As will be understood, the respective disengagements of the outer shaft 13 and the inner shaft 12 are respectively effected by axial movements of the abutments 46 and 52, in the direction of the arrows 61 and 62 of FIG. 1, the abutments being operated independently of each other by the forks 57 and 55. The movement of the abutment 46 along the arrow 61 determines the withdrawal of the first pressure-plate 25 following the arrow 65, with pivotal movement of the diaphragm 23 on the cover 21 around the tenons 42. The movement of the abutment 52 following the arrow 62 determines the movement of the casing 28 following the arrow 65 with pivotal movement of the outer edge 47 of the diaphragm 26 on the collar 48 of the cover 21. The transfer casing in turn drives the second pressure-plate 27 which moves away from the auxiliary plate 17 following the arrow 66. Thus, the two pressure-plates 25 and 27 carry out movements in opposite directions during de-clutching.

According to the second form of embodiment shown in FIGS. 6 to 10, in which parts corresponding to FIGS. 1–5 are indicated by primed reference numerals, and in which the friction disc 15' of the outer shaft 13' is applied on a face 41a of the auxiliary plate 17', while the friction disc 14' of the inner shaft 12' is applied against a face 40a of the fly-wheel 16', the two pressure-plates 25' and 27' carry out movements in the same direction during de-clutching.

The two control diaphragms 23' and 26' are then both supported on the cover by tenons indicated respectively by 70 and 71, located on a circumference intermediate between the inner edge and the outer edge of these diaphragms. The inner edges 72 and 73 of these diaphragms are respectively subjected to the action of two de-clutching abutments or stops 74 and 75, while their outer edges 76 and 77 are respectively coupled to the first pressure-plate 25' by clips 44' (see FIG. 10), and to the casing 28' by clips 78.

The de-clutching abutment 74 slides by a sheath on a sleeve 80 fixed to the clutch casing; the abutment 75 slides the sheath of the abutment 74. The abutments 74 and 75 are respectively operated by two oscillating forks 82 and 83 which are in engagement with lateral arms 84 and 85 respectively carried by these abutments.

The respective de-clutching of the outer shaft 13' and the inner shaft 12' is effected by axial movements of the abutments 74 and 75 in the direction of the arrows 86 and 87 of FIG. 6, operated independently of each other by the forks 82 and 83. The movement of the abutment 74 following the arrow 86 operates the withdrawal of the first pressure-plate 25' following the arrow 88 with pivotal movement of the diaphragm 23' on the cover 21' about the tenons 70. The movement of the abutment 75 following the arrow 87 determines the movement of the casing 28' along the arrow 89, with pivotal action of the diaphragm 26' on the cover 21', about the tenons 71. The transfer casing 28' in turn drives the second pressure-plate 27' which thus moves away from the fly-wheel 16' in the direction of the arrow 90. Thus, the two pressure-plates 25' and 27' carry out movements in the same direction during de-clutching.

It will be noted that the first form of embodiment (described above with reference to FIGS. 1 to 5) is more compact than the second shown in FIGS. 6 to 10. This first form of embodiment also has the advantage that in the engaged position, the cover 21 is subjected to axial stresses of opposite sign on the edge 48–47 and at 42;

which has the result of producing very small stresses on the screws 22. It will also be appreciated that the clutch in accordance with this form of embodiment can be assembled to form an independent unit, mounted subsequently as a unit on the fly-wheel.

It could be feared that in the first form of construction, the auxiliary plate 17 might be subjected to relatively considerable heating by reason of the two friction discs which are applied to it, such heating effects being liable to have an adverse effect on the roller bearing 33. In reality, this risk of heating of the plate 17 is only apparent, since in normal use the clutch engagement on the two shafts is not generally effected simultaneously. When this clutch with two outputs is mounted, for example, on a tractor, one of the shafts corresponds to the power take-off while the other shaft is coupled to the driving gear.

The second form of construction described with reference to FIGS. 6 to 10 is less compact than the first. However, this second form of construction is better suited to very heavy use. The two friction discs are applied against two different plates; it will furthermore be noted that in this case it is possible to provide the second pressure-plate 27′ with radial fins which permit the ventilation of the space included between the plates 17′ and 27′.

It will thus be understood that the adoption of one or the other of the forms of embodiment according to the invention will depend essentially on the utilization intended for the clutch; one or the other will be preferred, depending on the case.

The invention is not of course limited to the forms of construction selected and shown, which have only been given by way of example but which may on the contrary form the subject of various alternative forms of construction within the scope of the invention.

In particular, in the case where the displacement of one and/or the other diaphragm is effected by action of the abutment on an intermediate ring fast for rotation with the cover and the diaphragm, the rotational coupling could be also effected by tangential tongues arranged between the said ring and the cover or the diaphragm. This coupling could also be effected by a small plate carrying elastic radial arms.

Instead of controlling the two driven shafts 12 and 13 independently of each other, it is also possible to envisage conjoint operation of the controls so as to effect the declutching operations in a suitable order, by appropriate arrangements provided in the rod transmission systems. It is also possible to consider the arrangement of the two operating forks on the same shaft, or eventually to bring on to the same axis by appropriate rod systems, the controls of two non-coaxial forks such as those shown.

What I claim is:

1. A clutch comprising a driving shaft, reaction plate means rigid with said driving shaft and having a first and a second reaction friction face, a first driven shaft, a first friction disc rigid in rotation with said first driven shaft, a first pressure plate rigid in rotation with said reaction plate means and operable to grip said first friction disc between said first pressure plate and said first reaction face, a first elastic diaphragm operable to urge said first pressure plate to clamp said first friction disc between said first pressure plate and said first reaction face, a first cover rigid with said reaction plate means on which said first elastic diaphragm is rockably mounted, first declutching means for pushing said first diaphragm to rock said first diaphragm to release said first friction disc, a second driven shaft concentric with said first driven shaft, a second friction disc rigid in rotation with said second driven shaft, said second friction disc being in the first friction disc vicinity, said first friction disc being located between said second friction disc and said first diaphragm, a second pressure plate rigid in rotation with said reaction plate means and operable to grip said second friction disc between said second pressure plate and said second reaction face, a second cover surrounding said first cover and rigid with said second pressure plate, a second elastic rockably mounted diaphragm operable to urge said second cover to clamp said second friction disc between said second pressure plate and said second reaction face, said second diaphragm being in the first diaphragm vicinity, said first diaphragm being located between said second diaphragm and said first friction disc, and second declutching means for pushing said second diaphragm to rock said second diaphragm to release said second friction disc.

2. A clutch as claimed in claim 1 further comprising a flywheel rigid with said driving shaft, wherein said reaction plate means comprises a reaction plate member having circumferentially spaced first lugs, said first lugs being rigidly connected with said flywheel, said second pressure plate having circumferentially spaced second lugs, said second lugs being alternated with said first lugs, said second cover being rigidly connected with said second lugs.

3. A clutch as claimed in claim 1 wherein a first series of circumferentially spaced tangentially directed tongues interconnects said first pressure plate and said first cover and a second series of circumferentially spaced tangentially directed tongues interconnects said second cover and said reaction plate means, said first tongues series being arranged on a smaller radius than said second tongues series, tongues of said first tongues series being alternated with tongues of said second tongues series, all said tongues being substantially coplanar.

4. A clutch as claimed in claim 1, wherein said reaction plate means comprises a reaction plate member, further comprising a flywheel rigid with said driving shaft, said reaction plate member having peripheral portions rigidly connected with said flywheel and a central portion surrounding said first driven shaft, and a ball bearing between said central portion and said first driven shaft.

5. A clutch as claimed in claim 1 further comprising a flywheel rigid with said driving shaft wherein said reaction plate means comprise a reaction plate rigidly connected with said flywheel and having two opposed faces comprising the two said reaction faces respectively.

6. A clutch as claimed in claim 1 wherein said second elastic diaphragm is rockably mounted on said second cover.

7. A clutch as claimed in claim 1 wherein said reaction plate means comprise two axially spaced rigidly interconnected reaction plates, each having one of said reaction faces.

8. A clutch as claimed in claim 1 wherein said second elastic diaphragm is rockably mounted on said first cover.

References Cited by the Examiner

UNITED STATES PATENTS 2,540,639   2/51   Winther et al.
2,672,226   3/54   Zeidler.
2,700,444   2/55   Ahlen.
2,885,047   5/59   Kehrl.

FOREIGN PATENTS 635,042   3/50   Great Britain.

DAVID J. WILLIAMOWSKY, *Primary Examiner.*